Dec. 10, 1963 C. M. MELAS 3,114,109

SELF-CLOCKING SYSTEM FOR BINARY DATA SIGNAL

Filed July 1, 1959 2 Sheets-Sheet 1

INVENTOR.
CONSTANTIN M. MELAS

BY [signature]

ATTORNEY

Dec. 10, 1963 C. M. MELAS 3,114,109

SELF-CLOCKING SYSTEM FOR BINARY DATA SIGNAL

Filed July 1, 1959

2 Sheets-Sheet 2

3,114,109
SELF-CLOCKING SYSTEM FOR BINARY DATA SIGNAL

Constantin M. Melas, Saratoga, Calif., assignor to International Business Machines Corporation, New York, N.Y., a corporation of New York Filed July 1, 1959, Ser. No. 824,380
5 Claims. (Cl. 328—63)

This invention relates in general to self-clocking systems for binary data signals, and, in particular, to a system for clocking a binary data signal which is subject to momentary distortions.

Generally, in order to recover the information contained in a binary coded digital data signal, the signal must be sampled at each bit time. This sampling operation, referred to in the art as "clocking," is accomplished under the control of a clock signal which is synchronous with the binary coded data signal. In situations where the frequency or bit rate of the data signal does not vary, the sampling operation creates little or no problem, in that a stable oscillator having an oscillating frequency corresponding to the bit rate may be provided, and once the two signals are synchronized the sampling may proceed without incident.

In some situations the bit rate of the binary coded data signal is not constant, but varies slowly over a small range of frequencies. Such an instance is best exemplified in the case where the binary data signal is being generated by a magnetic transducer scanning a magnetic record. It will be seen that the bit rate of the data signal is directly related to the scanning rate, and hence when the scanning rate changes the data signal is no longer in synchronism with a clock signal derived by an independent oscillator.

In order to avoid the problem caused by changes in scanning rate, the prior art has suggested recording a permanent clock track on the recording surface so that if the scanning rate varies, the frequency of both signals is affected in the same manner and, hence, are maintained in synchronism. While this clocking arrangement undoubtedly has many advantages it also has some limitations, particularly where more than one cyclic record carrier is employed with a common clock track, where more than one reading transducer is employed with a common recording path, and where the reading transducer is moved to different recording paths.

To avoid the problems encountered with a prerecorded clock track the self-clocking system, disclosed by U.S. Patent 2,864,078, was developed. In that system a pair of oscillators are provided which operate alternately to provide a single clock signal for interpreting a recorded data signal, the oscillators being switched back and forth at points of transition between binary values of the data signal by means of a conventional trigger which is controlled directly by the data signal. The clock signal comprising the combined outputs of the oscillators may therefore be considered as a single signal which is resynchronized with the data signal at each data transition point.

The problem of recovering data from a binary coded digital data signal which has been transmitted through a conventional communication channel, such as a standard telephone network, createst additional clocking problems. Since most communication channels have been designed primarily for voice communication, tolerances on noise and distortion are not as close as if the system had been designed for data transmission, as is the case in most magnetic recording systems. The data signal is therefore often distorted when it is received, the distortion taking the form of momentary errors in "synchronism" between the signal as transmitted and the signal as received, the phase of the received signal being adjusted to compensate for the time required to transmit the signal from the transmitter to the receiver. This type of distortion is commonly referred to in the art as jitter distortion, and in high-speed data transmission has the effect of increasing or decreasing the instantaneous frequency or length of a binary bit by as much as fifty percent of the original frequency within a relatively few bit intervals. It should be noted, however, that the average frequency of the transmitted signal is usually not affected by jitter distortion, although the phase of the signal received may vary relative to the phase of the signal transmitted for other reasons.

Clocking arrangements for data receivers suggested in the prior art have overcome the problem of the received signal varying in phase relative to the transmitted signal by deriving the clock signal directly from the received data signal, however, these arrangements are not capable of generating a clock signal from the received signal where it is subject to jitter distortion. Likewise, clocking arrangements suggested in the prior art for use with magnetic recording systems are not adapted to data receivers because of their inability to clock data signals subject to jitter distortion.

One manner suggested in the prior art for clocking a data signal subject to jitter distortion is to transmit a pilot signal simultaneously with the data signal, but at a different frequency, and derive a clock signal at the receiver under the control of this pilot signal. Such an arrangement is quite satisfactory where the delay characteristics of the communication channel do not change. However, in the transmission of data between the transmitter and the receiver a number of different telephone circuits, solely under the control of the telephone company, will undoubtedly be employed individually at different times. In clocking arrangements employing a transmitted pilot signal, this necessitates a phasing adjustment of the receiver clock each time a different telephone circuit is used.

It has been found in accordance with the present invention that an improved clocking arrangement may be provided for clocking a binary coded digital data signal subject to jitter distortion. The improved clocking system of the present invention employs, generally, an astable device such as a free-running multivibrator adjusted to operate at the bit rate frequency of the data signal, means for generating a clamping pulse which starts in phase with each binary data transition of the data signal and lasts for one-half bit time, and means connected between the clamping pulse generator and the free-running multivibrator for clamping the output of the multivibrator to a predetermined voltage level for one-half bit intervals after each binary data transition. It will be seen that as soon as the clamp is released the multivibrator changes state and the transition provides a sampling point occurring always one-half bit time after each data transition. The output of the multivibrator therefore corresponds to a clock signal which is resynchronized with the data signal at each data transition point.

It is therefore an object of the present invention to provide an improved clocking arrangement for binary data signals.

Another object of the present invention is to provide a clocking system for a binary coded signal which is capable of interpreting data contained in the data signal under conditions where the intervals of closely adjacent data bits vary considerably.

A further object of the present invention is to provide an improved clocking arrangement for a binary coded digital data signal which has been transmitted through a communication channel subject to distortion.

The foregoing and other objects, features and advantages of the invention will be apparent from the following more particular description of preferred embodiments of the invention, as illustrated in the accompanying drawings.

Figure 1:
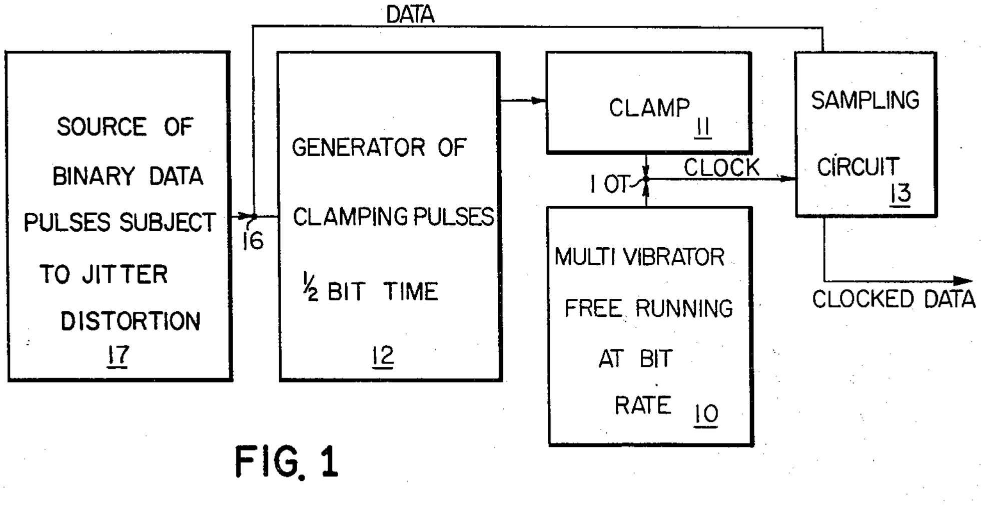
FIG. 1 is a block diagram of the self-clocking system of the present invention.

Referring to the drawings, and particularly to FIG. 1, the clocking arrangement illustrated therein comprises generally an astable multivibrator 10 which is designed to operate at the bit rate frequency of the binary coded data signal to be clocked, means 11 operable to clamp an output terminal 10T of the multivibrator 10 to a predetermined voltage level in response to a clamping pulse, means 12 for generating clamping pulses which have a time duration equal to one-half the bit time of the data signal in response to each transition of the data signal, and sampling means 13 under the control of the output signal of the multivibrator 10 for providing the clocked data signal.

Figure 3:
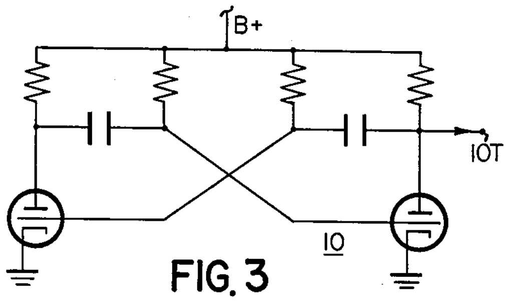
FIG. 3 is a schematic diagram of one multivibrator circuit of FIG. 1.

FIG. 3 illustrates a conventional astable multivibrator which may be employed in the system of FIG. 1. Multivibrator 10 provides a square-wave output signal having a frequency corresponding to the bit rate frequency of the data signal. For a detailed description of the operation and structure of a multivibrator, reference may be had to Section 6–12, page 199 of the work entitled, "Pulse and Digital Circuits" (Library of Congress Card Catalog No. 55-11930) by Millman and Taub, published by McGraw-Hill Publishing Company.

Figure 4:
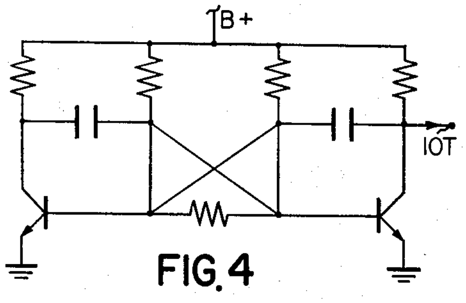
FIG. 4 is a schematic diagram of an alternate multivibrator circuit of FIG. 1.

An astable multivibrator circuit employing transistors, which may be employed in place of the multivibrator shown in FIG. 3, to provide a suitable output signal is shown in FIG. 4. Such a circuit is conventional and may be found in many of the standard texts.

Figure 5:
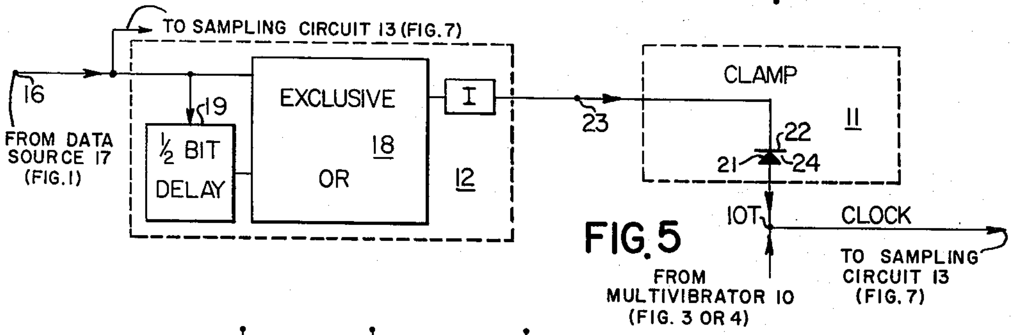
FIG. 5 is a schematic diagram of one clamping pulse generator and clamp of FIG. 1.

The clamp 11 and the clamping pulse generator 12 for the system of FIG. 1, are illustrated in block diagram form in FIG. 5. As shown therein, the clamping pulse generator 12, includes an input terminal 16 adapted to be connected to a source 17 of data signals, an "Exclusive OR" circuit 18, and a delay unit 19 for delaying the data signal for a time interval corresponding to one-half bit time. The function and operation of "Exclusive OR" circuits are explained in Section 13–9, page 411 of the above-mentioned reference, and since "Exclusive OR" circuits are well known in the art, a detailed description does not appear to be warranted. In general they operate as a "gate" having two input taps and one output tap which provides an output signal only if a pulse is applied to only one input tap. The output signal is inverted by inverter I prior to being supplied to clamp 11.

Any suitable delay unit 19 may be employed in the circuit of FIG. 5 and since such units are conventional in the art, a detailed description does not appear to be warranted. An electromagnetic delay line having the proper characteristics operates satisfactorily as the one-half bit delay unit.

The clamping means 11 comprises a diode 21 which has its cathode 22 connected to the output tap 23 of the clamping pulse generator 12 and its anode 24 connected to the output terminal 10T of the multivibrator 10. A clamping pulse CP supplied to the cathode 22 of the diode 21 therefore clamps output terminal 10T of the multivibrator to a predetermined voltage preventing the multivibrator 10 from changing states until released by the clamping pulse.

Figure 6:
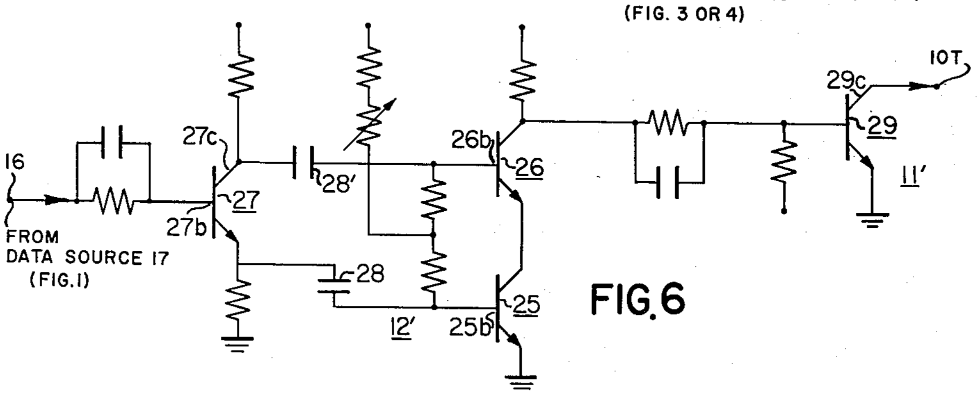
FIG. 6 is a schematic diagram of an alternate clamping pulse generator and clamp of FIG. 1.

FIG. 6 illustrates a clamping pulse generator 12′ and clamp 11′ which may be employed in place of the clamping pulse generator 12 and clamp 11, shown in FIG. 5. As shown in FIG. 6, the clamping pulse generator 12′ comprises a pair of transistors 25 and 26, each of which is arranged as a single shot multivibrator, and a transistor 27, which is arranged as a phase inverter. The data signal is supplied to the base electrode 27*b* of the phase inverter transistor 27. The base electrode 25*b* of transistor 25 is connected to the emitter electrode 27*e* of transistor 27 through capacitor 28, while the base electrode 26*b* of transistor 26 is connected to the collector electrode 27*c* of the transistor 27 through capacitor 28′. Each single shot multivibrator responds to negative going transitions of the data signal and generates a clamping pulse CP having a length determined by the discharge rates of capacitors 28 and 28′ which correspond to one-half bit interval of the data signal. Transistor 26 is therefore supplied with the data signal directly while transistor 25 is supplied with the inverted data signal. The clamping pulses CP are supplied to transistor 29 which functions as a clamp for the transistorized multivibrator shown in FIG. 4, the collector electrode 29*c* of transistor 29 being connected to terminal 10T in FIG. 4.

The clamped output terminal 10T of the multivibrator 10 is connected to one input terminal of the sampling circuit 13, while the data signal is supplied to the other terminal. The operation and function of the sampling circuit is explained later on in the specification.

Figure 2:
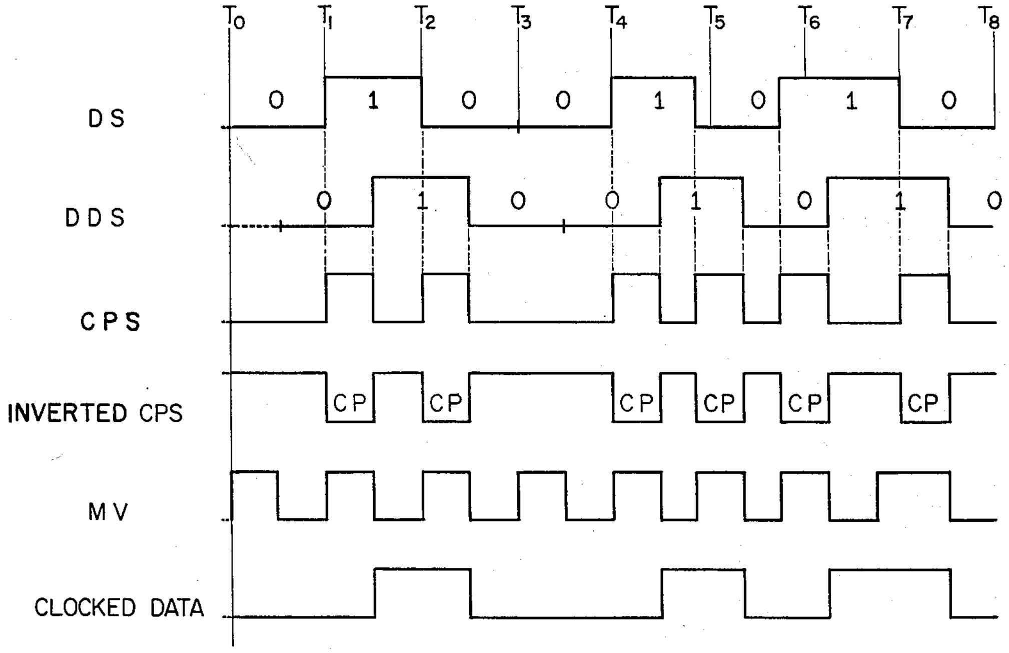
FIG. 2 is a graph illustrating signals at different points in the system of FIG. 1.

FIG. 2 illustrates wave forms appearing at various points in the system. As shown therein, the wave form designated DS represents a binary coded data signal 01001010 which has been subjected to jitter distortion at the fifth, sixth and seventh bit times. The distortion has decreased the length of the fifth and sixth bits "1" and "0" and increased the length of the seventh bit which is also a "1." The wave forms DS represents an oversimplified example of the effect of jitter distortion on a data signal, but will suffice to explain the operation of the system of FIG. 1. It may be assumed that the signal DS, as shown in FIG. 2, is obtained from a suitable data signal source such as the data signal receiver disclosed and claimed in the copending application of Harold G. Markey, Serial No. 743,576, filed June 23, 1958, which is assigned to the assignee of the present invention.

The data signal DS is supplied to the clamping pulse generator 12 and to the sampling circuit 13. The clamping pulse generator 12 provides the clamping pulse signal designated CPS in FIG. 2. As shown, the clamping signal CPS comprises a plurality of clamping pulses CP which have a length corresponding to one-half the length of a bit of the data signal DS and which start at each transition of the data signal. Signal CPS may be generated by the arrangement shown either in FIGS. 5 or 6 or any other suitable arrangement which provides the same function. Assuming the clamping pulse generator illustrated in FIG. 5 is employed, the "Exclusive OR" circuit 18 is supplied with the data signal DS and the delayed data signal DDS of FIG. 2 through delay unit 19. The output of the "Exclusive OR" circuit is connected to an inverter I, to provide the clamping pulses CP of the inverted clamping pulse signal CPS to the clamping means 11.

The output square-wave signal of the multivibrator is designated MV in FIG. 2, and as shown has a free-running frequency which corresponds to the bit rate frequency of the data signal DS. The output terminal 10T of the multivibrator is connected to the anode of the clamp 11. A clamping pulse CP therefore clamps the output terminal of the multivibrator to a predetermined voltage level for one-half bit time after each data transition. The unclamped signal of the free-running multivibrator may be considered to be rephased with the data signal at each data transition point. It may therefore function as a conventional clock signal when supplied to a sampling circuit jointly with the data signal DS to provide a clocked data signal.

Figure 7:
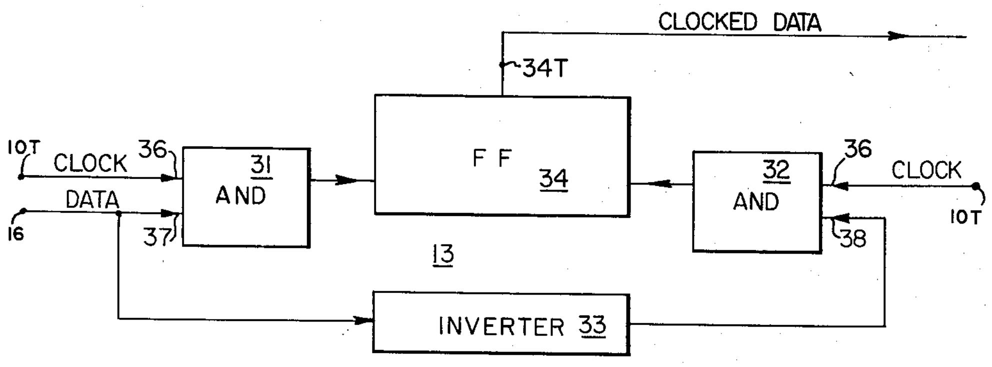
FIG. 7 is a schematic diagram of the sampling circuit of FIG. 1.

A sampling circuit is shown in FIG. 7, which may be employed to provide a clocked data signal. The sampling circuit, as shown in FIG. 7, comprises a pair of conventional AND gates 31 and 32, an inverter 33, and a conventional bistable trigger unit 34. The clock signal from the output terminal 10T of the multivibrator 10 is supplied to one terminal 36 of each AND gate while the data signal is supplied directly to the other termnial 37 of AND gate 31, and indirectly through inverter 33 to the terminal 38 of the AND gate 32. The output terminals of the AND gates are connected to the set and reset terminals, respectively, of the trigger 34 and the appropriate output terminal 34T of the trigger 34 therefore supplies the clocked data signal.

While the invention has been particularly shown and described with reference to preferred embodiments thereof, it will be understood by those skilled in the art that various changes in form and details may be made therein without departing from the spirit and scope of the invention.

What is claimed is:

1. A clock signal generator system adapted to receive a bivalued signal from a source thereof, comprising: a free-running multivibrator having an output; a flip-flop having two inputs and an output on which is generated the clock signal; a first "AND" gate having two inputs and an output, one input being connected to the output of said multivibrator, the other input being connected to the bivalued signal source and the output being connected to one input of said flip-flop; a first inverter having an input and an output, the input being connected to the bivalued signal source; a second "AND" gate having two inputs and an output, one input being connected to the output of said multivibrator, the other input being connected to the output of said inverter and the output being connected to the other input of said flip-flop; a delay circuit having an input and an output, the input being connected to the bivalued signal source; an exclusive "OR" gate having two inputs and an output, one input being connected to the bivalued signal source and the other input being connected to the output of said delay circuit; and a second inverter having an input and an output, the input being connected to the output of said exclusive "OR" gate and the output being connected to the output of said multivibrator.

2. A clock signal generator system for a bivalued signal emanating from a source thereof, comprising:
- a source of continuous signals;
- a bistable circuit in which the clock signal is generated;
- a first coincidence circuit connected to said source of continuous signals and responsive to the continuous signals and connected to the source of the bivalued signal and responsive to the bivalued signal to set said bistable circuit;
- a second coincidence circuit connected to said source of continuous signals and responsive to the continuous signals and connected to the source of the bivalued signal and responsive to the complement of the bivalued signal to reset said bistable circuit;

and,
- means connected to the source of the bivalued signal and responsive to the bivalued signal and connected to said source of continuous signals to clamp the continuous signals at the repetition rate of the bivalued signal.

3. A clock signal generator for a digital signal emitted from a source thereof, comprising:
- a multivibrator;
- a flip-flop in which the clock signal is generated;
- a first AND gate connected to the output of said multivibrator and the source of the digital signal to set said flip-flop;
- an inverter connected to the source of the digital signal;
- a second AND gate connected to the output of said multivibrator and the output of said inverter to reset said flip-flop;

and,
- means connected to the source of the digital signal and responsive to transitions of the digital signal to clamp said multivibrator frequency at the repetition rate of the digital signal.

4. A clock signal generator adapted to synchronize a digital signal generated by a source thereof, comprising:
- a multivibrator;
- a flip-flop in which the clock signal is generated;
- a first AND gate connected to the output of said multivibrator and the digital signal source to set said flip-flop;
- an inverter connected to the digital signal source;
- a second AND gate connected to the output of said multivibrator and the output of said inverter to reset said flip-flop;
- a delay circuit connected to the digital signal source;

and,
- an OR gate connected to the digital signal source and the output of said delay circuit and operative to provide a clamping signal for said multivibrator from only one.

5. A clock signal generator for synchronization of a binary signal emanating from a source thereof, comprising:
- a multivibrator operating at approximately the bit period rate of the binary signal;
- a flip-flop from one output of which the clock signal is taken;
- a first AND gate connected to the output of said multivibrator and the binary signal source to trigger said flip-flop to one of its states;
- an inverter also connected to the binary signal source;
- a second AND gate connected to both the outputs of said multivibrator and said inverter to trigger said flip-flop to the other of its states;
- a delay circuit connected to the binary signal source to provide a delay of less than a bit period;

and,
- an OR gate connected to the binary signal source and said delay circuit so as to be responsive only to either the binary signal or the output of said delay circuit to provide a clamping signal for said multivibrator.

References Cited in the file of this patent

UNITED STATES PATENTS

| | | |
|---|---|---|
| 2,714,705 | Volz | Aug. 2, 1955 |
| 2,863,054 | Dobbins | Dec. 2, 1958 |
| 2,883,525 | Curtis | Apr. 21, 1959 |
| 2,892,936 | Paivinen | June 30, 1959 |
| 2,892,943 | Tollefson et al. | June 30, 1959 |
| 2,912,684 | Steele | Nov. 10, 1959 |
| 2,923,820 | Tiquori | Feb. 2, 1960 |
| 3,046,416 | Case | July 24, 1962 |